United States Patent
Shen

(10) Patent No.: US 7,375,879 B1
(45) Date of Patent: May 20, 2008

(54) STRUCTURE WITH SATURABLE OPTICAL ABSORBENT FOR DEVICE FOR REGENERATING OPTICAL SIGNALS

(75) Inventor: Alexandre Shen, Paris (FR)

(73) Assignee: Alcatel (FR)

(*) Notice: Subject to any disclaimer, the term of this patent is extended or adjusted under 35 U.S.C. 154(b) by 0 days.

(21) Appl. No.: 11/483,183

(22) Filed: Jul. 10, 2006

(30) Foreign Application Priority Data

Jul. 8, 2005 (FR) .................................. 05 07321

(51) Int. Cl.
*H01S 4/00* (2006.01)
(52) U.S. Cl. .................... 359/344; 398/175; 398/180
(58) Field of Classification Search ............... 359/344; 398/97, 175, 180
See application file for complete search history.

(56) References Cited

U.S. PATENT DOCUMENTS

| | | | | |
|---|---|---|---|---|
| 5,111,153 A | * | 5/1992 | O'Mahony et al. | 359/336 |
| 6,281,519 B1 | * | 8/2001 | Sugiyama et al. | 257/14 |
| 6,625,337 B2 | * | 9/2003 | Akiyama | 385/14 |
| 6,807,357 B2 | * | 10/2004 | Shen | 385/140 |
| 7,109,526 B2 | * | 9/2006 | Gentner et al. | 257/94 |

FOREIGN PATENT DOCUMENTS

| | | |
|---|---|---|
| EP | 1122582 A2 | 8/2001 |
| EP | 1122582 A3 | 10/2001 |
| EP | 1229588 A1 | 8/2002 |

OTHER PUBLICATIONS

Guina et al., "Saturable Absorber Intensity Modulator", IEEE Jounral of Quantum Electronics, pp. 1143-1149, vol. 39, No. 9 Sep. 2003.*

XP-002375774; High Speed, High Switching Contrast Quantum Well Saturable Absorber for 160 Gbit/s Operation; D.Massoubre et al; CThD3 2005 Conference on Lasers & Electro-Optics (CLEO).

Massoubre D et al: "High Speed, high switching contrast quantum well saturable for 160 Gbit/s operation" 2005 Conference on Lasers and Electro-Optics (CLEO) May 22-27, 2005 Baltimore, MD pp. 1593-1595.

Oudar J-L et al: "Ultra-Fastr Quantum Well Saturable Absorber Devices and their Telecommunication Optical Signals" Paris, Fr vol. 58 No. 11/12, Nov. 2003, pp. 1667-1707.

Abstract EP 1 229 588 A Aug. 7, 2002 Alcatel.

Abstract EP 1 291 707A Mar. 12, 2003 Alcatel.

Abstract EP 1 222 582 A Aug. 8, 2001 DDI Corporation.

* cited by examiner

*Primary Examiner*—Deandra M. Hughes
*Assistant Examiner*—Eric Bolda
(74) *Attorney, Agent, or Firm*—Lowe Hauptman Ham & Berner, LLP

(57) ABSTRACT

The field of the invention is that of devices for regenerating optical signals. It applies more particularly to systems for high-throughput long distance transmission by optical fibres of digital data. While propagating, optical signals necessarily experience attenuation and degradation of their signal/noise ratio. To compensate for these degradations, wholly-optical regeneration devices are generally used. The object of the invention is to ensure regeneration which in large part eliminates noise, without using auxiliary optical devices. This regeneration is ensured by a structure with saturable optical absorbent comprising an optical cavity of thickness L comprising at least one layer of active material of Henry factor $\alpha_H$ and of maximum absorption variation $\Delta\alpha$ such that the thickness L equals about $2\pi/(\alpha_H, \Delta\alpha)$.

14 Claims, 4 Drawing Sheets

STRUCTURE WITH SATURABLE OPTICAL ABSORBENT FOR DEVICE FOR REGENERATING OPTICAL SIGNALS

BACKGROUND OF THE INVENTION

1. Field of the Invention

The field of the invention is that of devices for regenerating optical signals. It applies more particularly to high-throughput long-distance systems for transmission by optical fibres of digital data. The throughputs transmitted by this type of link are typically several tens of gigabits per second and can exceed a terabit per second.

These long-distance transmissions can be performed, for example, by means of underwater cables.

2. Description of the Prior Art

The digital optical signals S which propagate inside an optical fibre consist of temporal pulses conventionally representing 1 or 0 logic levels. By way of example, FIG. 1 represents as a function of time, the variation of amplitude A of an initial signal $S_1$ comprising a succession of 1 or 0 logic levels. These signals generally have a format of RZ-OOK type, the acronym standing for Return-to-Zero On-Off Keying. While propagating, this signal $S_1$ necessarily experiences attenuation and degradation of its envelope and of its signal/noise ratio as indicated in FIG. 2 which represents the signal $S_2$ after propagation in an optical fibre.

To limit this phenomenon, a first possible solution consists in carrying out management of the optical dispersion occurring along the line. Powerful emission sources are used to this end and the distance separating two consecutive optical amplifiers is limited by taking account of the chromatic dispersion of the fibres used. These amplifiers are, for example, of the EDFA type, the acronym signifying: Erbium Doped Fibre Amplifier.

So that this signal can be utilized correctly, a second solution consists in regenerating it periodically. Very conventionally, regeneration comprises 3 processes which are called:

Resynchronization: The signal experiences phase noise. The pulse then drifts temporally. This phenomenon is also called "jitter". Consequently, resynchronization consists in resynchronizing the pulses with respect to a reference clock.

Reamplification: The attenuation of an optical fibre typically equals 0.2 dB/km. Over very long distances, greater than 1000 kilometres, it then becomes necessary to periodically reamplify the signal so that it remains utilizable.

Reshaping: The signal also experiences amplitude noise. The low and high parts of the pulse rectangles are noisy as may be seen in FIG. 2. It is therefore necessary to eliminate or to attenuate this noise.

When these 3 processes are implemented, one speaks of 3R regeneration. It is possible to demonstrate that resynchronization is not fundamental for certain applications. It is thus possible to produce a transoceanic link of more than 6000 kilometres without resynchronization. One then speaks of 2R regeneration (Reamplification and Reshaping).

To carry out this 2R regeneration, a possible method consists in carrying out a first transduction of the initial optical signal into an electronic signal, then in processing the electronic signal thus obtained, lastly in carrying out a second transduction of the processed signal into a final optical signal. When the signal is wavelength multiplexed, also called a WDM signal, the acronym signifying "Wavelength Division Multiplex", it is necessary to carry out regeneration on the whole set of elementary channels making up the WDM signal. This method then exhibits the main drawbacks of being expensive and complex, especially if the number of optical channels to be processed is significant and of course, the numerous opto-electronic transductions required decrease the reliability of the device.

Also, so-called all-optical procedures have been proposed. Generally, they rely on the use of structures with saturable absorbent.

The principle of optical regeneration with saturable absorbent is depicted in FIGS. 3, 4 and 5.

FIG. 3 presents a sectional view of an optical structure 1 with saturable absorbent. This structure 1 comprises essentially:

An active layer 2 consisting of a material with saturable absorbent;

Two reflecting mirrors 3 and 4 disposed on either side of the active layer 2;

So-called phase layers 5 and 6 disposed between the active layer 2 and the reflecting mirrors 3 and 4.

The optical structure is transferred onto a substrate 7.

The structure generally operates by reflection of light. In FIG. 3, the course of the light path through the structure is symbolized by straight barred arrows.

As illustrated in FIG. 4, the material with saturable absorbent is a material whose absorption coefficient α varies with the luminous power received. Thus, low powers are weakly absorbed while strongly/higher optical powers are weakly absorbed. The dynamic swing of the phenomenon being very significant, the variation of the absorption coefficient and the optical power are represented on logarithmic scales, the optical power conventionally being represented in dBm. 0 dBm corresponds to a power of a mW and 30 dBm to a power of 1 watt.

Generally, the active layer 2 of the absorbent is made either of ternary material, in particular of InGaAs or of AlGaAs, or of quaternary material.

The reflecting mirrors 3 and 4 make it possible to generate, inside the active layer, multiple reflections of the optical signal, thus increasing the optical path inside the active layer and multiplying its absorption effectiveness. In order that the multiple reflections are all in phase, phase layers 5 and 6 make it possible to adapt the optical length of the cavity situated between the mirrors 3 and 4.

It was seen that the noisy signal $S_2$ is composed of deformed rectangular light pulses. After reflection by the whole of the structure, the signal $S_2$ has become the signal $S_3$, the spurious noise of the low parts of the rectangles corresponding to the 0 logic levels has been in large part absorbed as illustrated in FIG. 5. The signal-to-noise ratio of the pulses is thus increased.

However, this procedure exhibits a drawback. As may be seen in FIG. 5, the spurious noise of the high parts of the temporal rectangles of the signal corresponding to the 1 logic levels is not attenuated. One thus speaks of 1.5R regeneration with reference to this phenomenon insofar as only the 0s of the signal are regenerated. Thus, if we desire full 2R regeneration, it is necessary to supplement the devices comprising structures with saturable absorbent with other optical devices making it possible to regenerate the 1 logic levels of the signal. These devices generally comprise compression fibres and/or filters.

SUMMARY OF THE INVENTION

The object of the invention is to provide 2R regeneration without using auxiliary optical devices by means of a particular structure with saturable absorbent.

More precisely, the invention is aimed at a structure with saturable optical absorbent for processing an incident amplitude-modulated optical signal of wavelength λ the said structure comprising an optical cavity of effective index $n_{\text{eff}}$, of geometric thickness L satisfying the relation $$L = \frac{k \cdot \lambda}{2 \cdot n_{\text{eff}}},$$

k being an integer, the said cavity comprising at least one layer of active material, of Henry factor $\alpha_H$ and of maximum absorption variation Δα caused by the dynamic swing in amplitude ΔP of the said incident signal to be processed, characterized in that the dynamic swing in amplitude of the incident signal and the geometric thickness L are such that the maximum absorption variation Δα satisfies the relation $$\Delta\alpha = \frac{2\pi}{L \cdot \alpha_H}.$$

Advantageously, the active layer is essentially a quantum well structure. It can comprise, in this case, several tens of quantum wells.

Advantageously, the active layer has a Henry factor $\alpha_H$ of greater than 50. It can be composed of quantum islets or boxes.

Advantageously, at least one so-called phase layer is disposed between one of the mirrors of the cavity and the layer of active material which can be ternary or quaternary.

The structure according to the invention advantageously applies to optical regenerators.

BRIEF DESCRIPTION OF THE DRAWINGS

The invention will be better understood and other advantages will appear on reading the non-limiting description which follows and by virtue of the appended figures, of which.

MORE DETAILED DESCRIPTION

Figure 1:
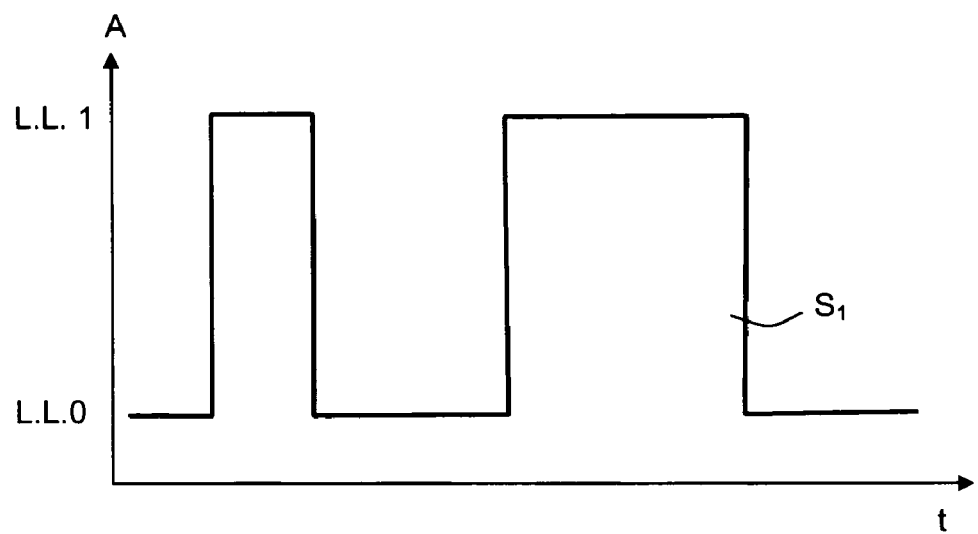
FIG. 1 represents the temporal variation of the amplitude of an initial optical signal.
Figure 2:
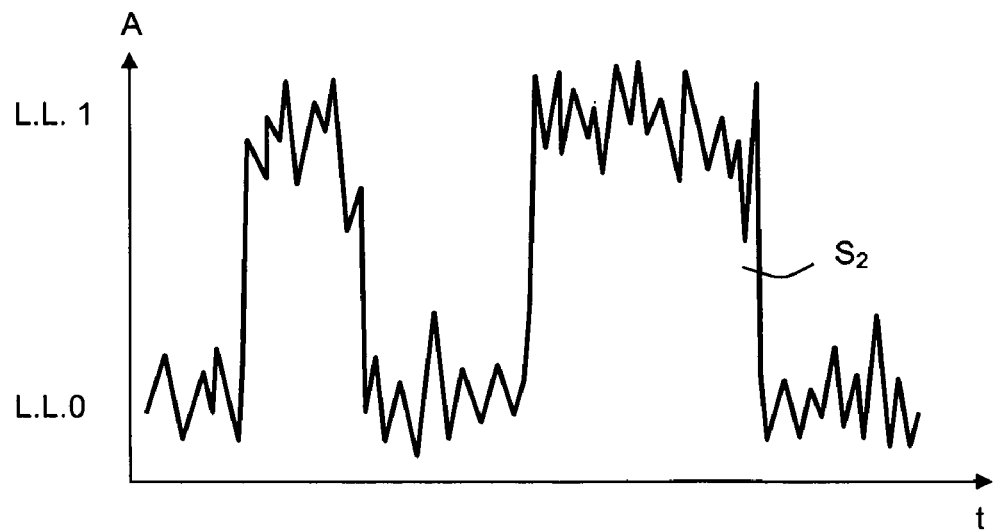
FIG. 2 represents the same signal after passing through an optical fibre.
Figure 3:
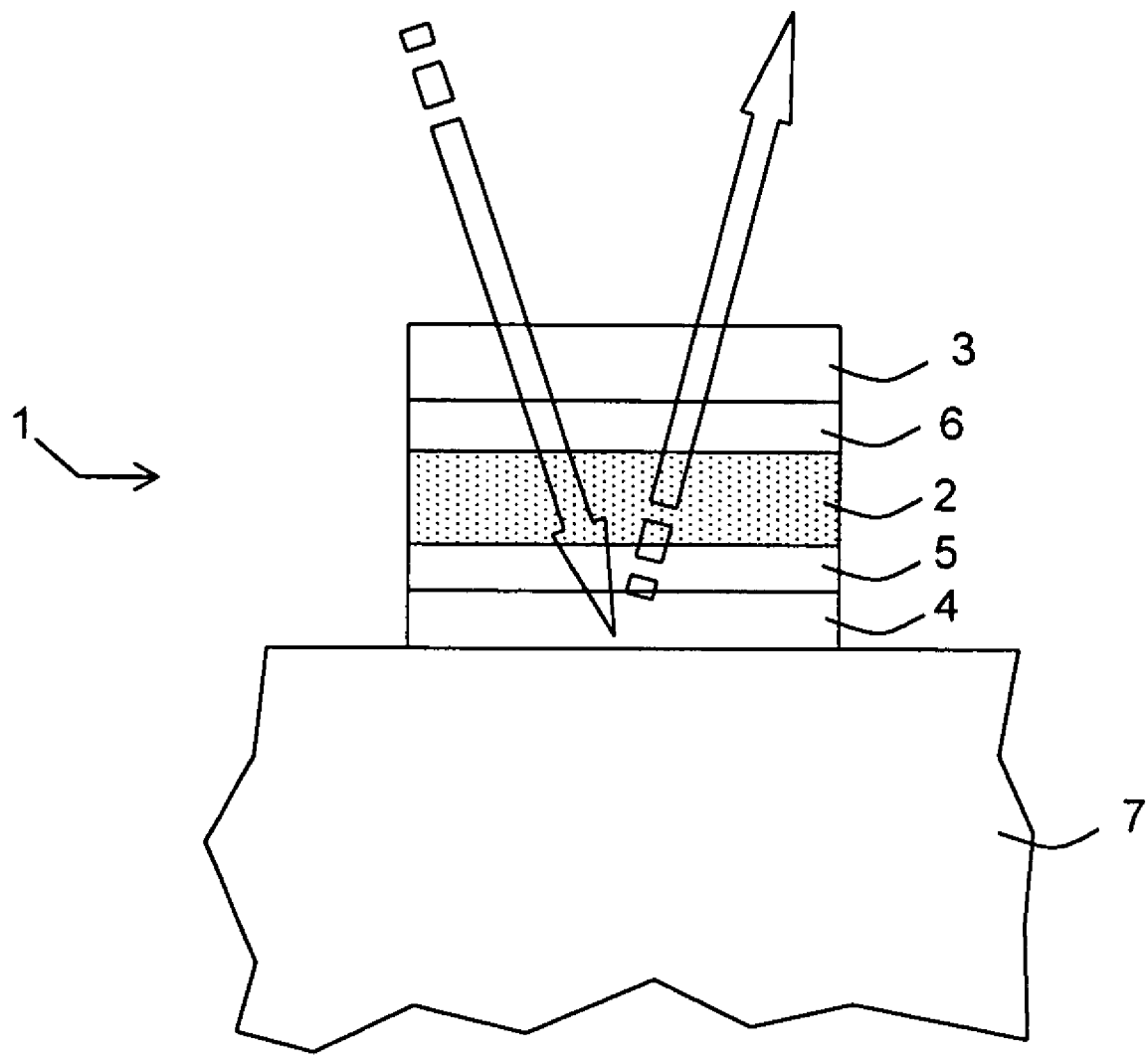
FIG. 3 represents the sectional view of a structure with saturable optical absorbent.
Figure 4:
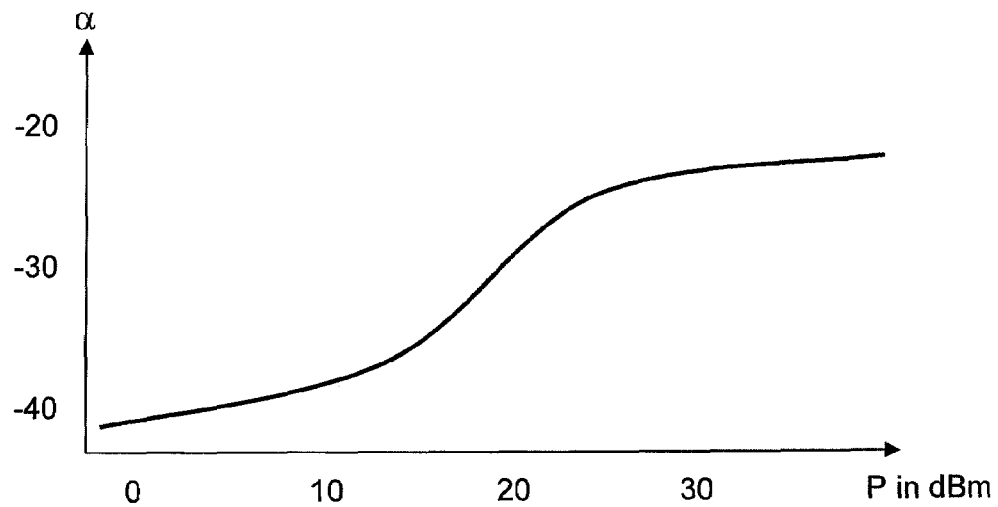
FIG. 4 represents the variant of absorption as a function of luminous intensity of a saturable optical absorbent according to the prior art.
Figure 5:
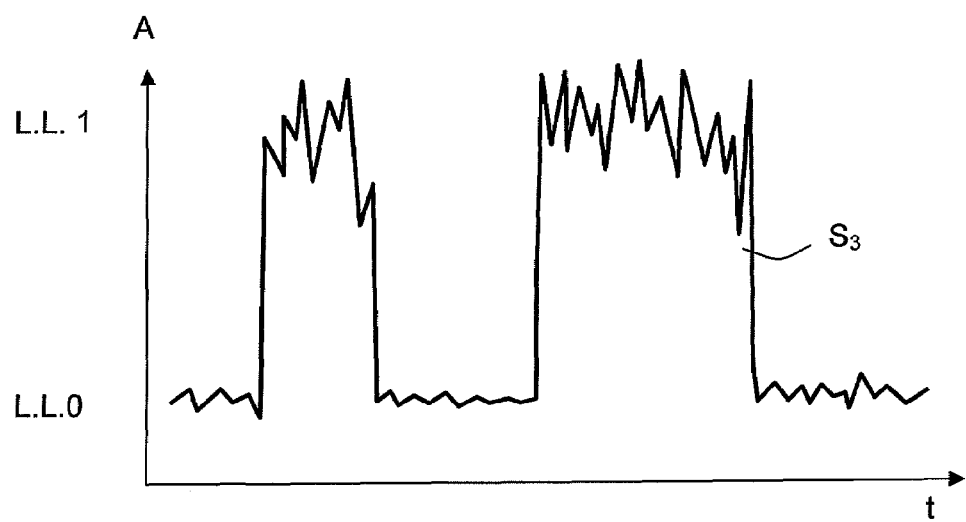
FIG. 5 represents the optical signal arising from an optical fibre after crossing a structure with saturable optical absorbent according to the prior art.

The drawback of the materials with saturable optical absorbent according to the prior art is that the medium is completely transparent when the intensity of the signal exceeds a certain threshold. Thus, the noise of the 1 logic levels is no longer filtered.

The core of the invention is to use a micro-cavity structure whose thickness is suitable for the characteristics of a material with saturable optical absorbent. Thus, the response of the material varies not only at low level but also at high level. Not only is the low-level noise filtered, but also the high-level noise, thus achieving genuine 2R regeneration.

It is known that, in materials with saturable optical absorbent, the differential index variation $$\frac{\partial n}{\partial N}$$

which corresponds to the variation of the optical index n as a function of the charge carriers N, and the differential absorption variation $$\frac{\partial \alpha}{\partial N}$$

which corresponds to the variation of the absorption coefficient α as a function of the charge carriers N are linked by a proportionality relation which equals:

$$\alpha_H = \frac{4\pi}{\lambda} \cdot \frac{\frac{\partial n}{\partial N}}{\frac{\partial \alpha}{\partial N}}$$

with $\alpha_H$: Henry factor and λ: wavelength in vacuo of the optical signal.

For a total index variation αn, the variation of the absorption coefficient Δα induced by the dynamic swing of the amplitude of the incident optical signal therefore equals:

$$\alpha_H = \frac{4\pi}{\lambda} \cdot \frac{\Delta n}{\Delta \alpha} \qquad \text{equation 1}$$

The index variation αn gives rise to a phase variation Δφ of the optical signal which conventionally equals:

$$\Delta\varphi = \frac{2\pi}{\lambda} \cdot \Delta n \cdot L$$

with L: geometric thickness of the optical cavity.

To obtain the desired absorption variation, it is necessary that the phase variation Δφ be at least equal to π.

We then obtain the relation linking the actual thickness of the cavity and the characteristics $\alpha_H$ and Δα of the material:

$$\Delta\alpha = \frac{2\pi}{L \cdot \alpha_H} \quad \text{equation 2}$$

It was seen that, to maximize the effect of the absorbent, the active layer is disposed between two reflecting mirrors making it possible to generate, inside the active layer, multiple reflections of the optical signal. Of course, this effect is possible only if the successive reflections are in phase and, consequently, if the thickness of the cavity satisfies equation 3 below:

$$L = \frac{k \cdot \lambda}{2 \cdot n_{eff}}; \quad \text{Equation 3}$$

$n_{eff}$ being the effective index of the medium and k: an integer.

It is necessary that equations 2 and 3 be satisfied simultaneously. We then obtain equation 4:

$$\Delta\alpha = \frac{4 \cdot \pi \cdot n_{eff}}{\alpha_H \cdot k \cdot \lambda}. \quad \text{Equation 4}$$

Knowing all the parameters of the device, this equation makes it possible to determine the variation of the absorption coefficient $\Delta\alpha$ required. It is, of course, possible to vary the parameter k which determines the thickness of the cavity so as to optimize the variation of the absorption coefficient $\Delta\alpha$.

From this is then deduced the dynamic swing $\Delta P$ of the amplitude of the incident optical signal making it possible to generate this variation. The absorption $\alpha$ is related to the optical power P by the conventional relation:

$$\alpha = \frac{\alpha_0}{1 + \frac{P}{P_{sat}}}$$

$P_{sat}$: optical power at saturation
i.e., $$\frac{P}{P_{sat}} = \frac{\alpha_0}{\alpha} - 1$$

Consequently, the absorption variation $\Delta\alpha$ induced by the dynamic swing $\Delta P$ of the amplitude of the optical signal equals:

$$\frac{\Delta P}{P_{sat}} = \frac{\alpha_0}{\alpha^2} \cdot \Delta\alpha$$

Figure 6:
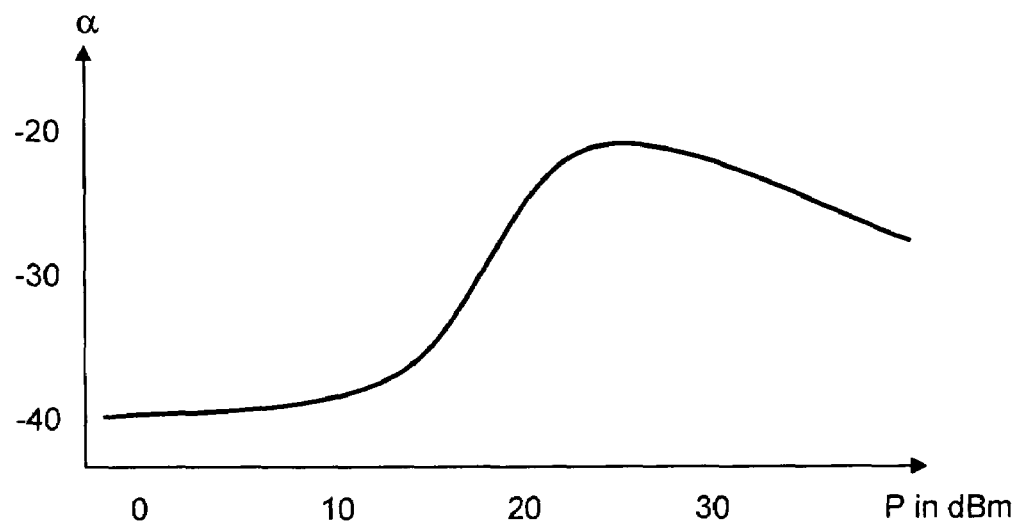
FIG. 6 represents the variant of absorption as a function of luminous intensity of a saturable optical absorbent according to the invention.
Figure 7:
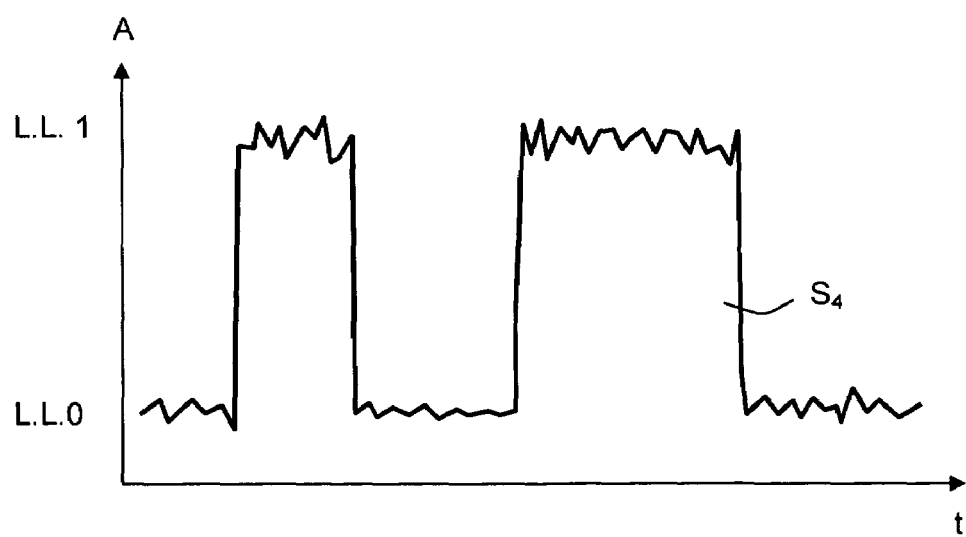
FIG. 7 represents the optical signal arising from an optical fibre after crossing a structure with saturable optical absorbent according to the invention.

When equation 4 is satisfied, the reflection coefficient varies with the luminous power received as illustrated in FIG. 6. After passing through a maximum, it decreases as the optical power continues to increase. Thus, after reflection by the component with saturable absorbent, the spurious noise of the low parts of the rectangles corresponding to the 0 logic levels and the spurious noise of the high parts of the rectangles corresponding to the 1 logic levels is in part absorbed as illustrated on the signal $S_4$ of FIG. 7. In this case, the regeneration function is fully 2R. The signal-to-noise ratio of the pulses is thus increased.

If one desires to retain structures of realistic dimensions, the Henry factor $\Delta_H$ must be relatively high, greater than 10 and if possible greater than 50.

The production of semi-conductor structures makes it possible to obtain appropriate Henry factors. They can be:
 either two-dimensional, comprising a plurality of quantum wells, the number of quantum wells possibly being several tens;
 or quasi-pointlike with "quantum islets" also called "quantum boxes" or "Quantum Dots" as they are known.

Quantum islets are micro-structures which comprise a minuscule quantity of free electrons. They are fabricated in materials of semi-conductor type and have dimensions of between a few nanometres and a few microns. The size and the shape of these structures and hence the number of electrons that they contain, can be precisely controlled; this number varying between a mere electron to a set of several thousand electrons. As in an atom, the energy levels in a quantum islet are quantized, thereby rendering these structures particularly beneficial for a large number of physical applications.

By way of first nonlimiting example, a first structure with quantum islets according to the invention has the following characteristics:
 Wavelength of use $\lambda$: 1555 nanometres
 Front mirror:
 Optical structure: Stack of 4 layers comprising 2 layers of silica (SiO2) and 2 layers of titanium oxide (TiO2);
 Optical index $n_{TiO2}$ of the TiO2: 2.266
 Thickness of the layers of TiO2: $\lambda/4n_{TiO2}$
 Optical index $n_{SiO2}$ of the SiO2: 1.468
 Thickness of the layers of TiO2: $\lambda/4n_{SiO2}$
 Phase layers:
 Nonsaturable absorption coefficient: $5.10^{-4}$/micron
 Active medium
 Structure with quantum islets
 Method of production: Stransky—Krastanov
 Deposited material: InAs
 Material of the separation layers: InGaAsP
 Thickness of the active islet-containing layers: 9 nanometres
 Nonsaturated absorption coefficient: 1/micron
 Thickness of the separation layers: 7 nanometres
 Nonsaturable absorption coefficient: $5.10^{-4}$/micron
 Henry Factor: <60
 Rear mirror
 Material: Silver
 Optical index $n_{AG}$: 0.2
 Absorption coefficient: 27.8/micron
 Substrate: Silicon By way of second nonlimiting example, a second quantum well structure according to the invention has the following characteristics:
 Wavelength of use $\lambda$: 1555 nanometres
 Front mirror:
 Structure: Stack of 4 layers comprising 2 layers of silica (SiO2) and 2 layers of titanium oxide (TiO2);
 Optical index $n_{TiO2}$ of the TiO2: 2.266
 Thickness of the layers of TiO2: $\lambda/4n_{TiO2}$
 Optical index $n_{SiO2}$ of the SiO2: 1.468
 Thickness of the layers of TiO2: $\lambda/4n_{SiO2}$ Phase layers:
Nonsaturable absorption coefficient: $5.10^{-4}$/micron
Active medium
Quantum well structure
Materials of the quantum well/barrier pair: InGaAlAs/ InGaAlAs or InGaAs/InP matched for lattice size to InP
Thickness of the quantum wells: 9 nanometres
Nonsaturated absorption coefficient: 1/micron
Thickness of the barriers: 7 nanometres
Nonsaturable absorption coefficient: $5.10^{-4}$/micron
Henry Factor: ~10
Number of quantum wells: ~80
Rear mirror
Material: Silver
Optical index $n_{AG}$: 0.2
Absorption coefficient: 27.8/micron.
Substrate: Silicon In this example, the use of a large number of quantum wells can give rise to significant thermal dissipation. The use of metal rear mirrors directly in contact with the substrate facilitates the removal of heat.

What is claimed is:

1. A structure configured to process an incident amplitude-modulated optical signal having: a wavelength λ; an optical power at saturation ($P_{sat}$); and a dynamic amplitude swing (ΔP), the structure comprising:

an optical cavity of effective index $n_{eff}$ and geometric thickness L satisfying the relation $$L = \frac{k \cdot \lambda}{2 \cdot n_{eff}},$$

k being an integer, the cavity including at least one layer of a saturable optical absorbent material of Henry factor $\alpha_H$ and of maximum absorption variation Δα;

wherein $$\Delta \alpha = \frac{2\pi}{L \cdot \alpha_H};$$

and
wherein the structure has operating characteristics satisfying the relationship $$\frac{\Delta P}{P_{sat}} = \frac{\alpha_0}{\alpha^2} \cdot \Delta \alpha,$$

wherein $\alpha_0$ is a constant and α is an arithmetic mean.

2. The structure according to claim 1, wherein the active layer is essentially a quantum well structure.

3. The structure according to claim 2, wherein the active layer comprises several tens of quantum wells.

4. An optical regenerator comprising the structure according to claim 3.

5. An optical regenerator comprising the structure according to claim 2.

6. The structure according to claim 1, wherein the active layer has a Henry factor $\alpha_H$ of greater than 50.

7. The structure according to claim 6, wherein the active layer is composed of quantum islets or boxes.

8. An optical regenerator comprising the structure according to claim 7.

9. An optical regenerator comprising the structure according to claim 6.

10. The structure according to claim 1, wherein at least one so-called phase layer is disposed between one of the mirrors of the cavity and the layer of active material.

11. An optical regenerator comprising the structure according to claim 10.

12. The structure according to claim 1, wherein the active material is ternary or quaternary.

13. An optical regenerator comprising the structure according to claim 12.

14. An optical regenerator comprising the structure according to claim 1.

* * * * *